United States Patent
Shuai

(10) Patent No.: US 11,948,395 B2
(45) Date of Patent: Apr. 2, 2024

(54) UNDER-SCREEN FINGERPRINT IDENTIFICATION DEVICE AND DISPLAY DEVICE

(71) Applicant: Wuhan China Star Optoelectronics Technology Co., Ltd., Hubei (CN)

(72) Inventor: Chuan Shuai, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 815 days.

(21) Appl. No.: 16/966,236

(22) PCT Filed: Nov. 11, 2019

(86) PCT No.: PCT/CN2019/117082
§ 371 (c)(1),
(2) Date: Jul. 30, 2020

(87) PCT Pub. No.: WO2021/082067
PCT Pub. Date: May 6, 2021

(65) Prior Publication Data
US 2023/0177864 A1    Jun. 8, 2023

(30) Foreign Application Priority Data
Oct. 29, 2019  (CN) .......................... 201911039580.4

(51) Int. Cl.
*G06V 40/13*       (2022.01)
*H04M 1/02*        (2006.01)

(52) U.S. Cl.
CPC ...... *G06V 40/1318* (2022.01); *H04M 1/0266* (2013.01)

(58) Field of Classification Search
None
See application file for complete search history.

(56) References Cited

U.S. PATENT DOCUMENTS

| | | | |
|---|---|---|---|
| 2019/0102593 A1 | 4/2019 | Wang et al. | |
| 2019/0286870 A1 | 9/2019 | Ling et al. | |
| 2020/0074142 A1 | 3/2020 | Yang et al. | |
| 2020/0210004 A1* | 7/2020 | Seo | G06F 3/04166 |
| 2021/0027035 A1* | 1/2021 | Tan | G02F 1/13318 |
| 2021/0097252 A1* | 4/2021 | Lee | G06V 40/1318 |
| 2021/0133417 A1* | 5/2021 | Tan | G06V 40/1324 |

FOREIGN PATENT DOCUMENTS

| | | |
|---|---|---|
| CN | 106228144 | 12/2016 |
| CN | 106295611 | 1/2017 |
| CN | 106709455 | 5/2017 |
| CN | 107193430 | 9/2017 |
| CN | 107256068 | 10/2017 |

* cited by examiner

Primary Examiner — Joseph R Haley

(57) ABSTRACT

Embodiments of the present disclosure provide an under-screen fingerprint identification device and a display device. The under-screen fingerprint identification device comprises a light guiding plate comprising a light guiding region, wherein the light guiding region is disposed in a display area of the display panel, and a light emitting element disposed under the light guiding region. Wherein the light emitting element comprises a plurality of light emitting pixel columns, the plurality of light emitting pixel columns form a light emitting pixel region as a light source for fingerprint identification, each of the plurality of light emitting pixel columns comprises a plurality of sensors.

14 Claims, 5 Drawing Sheets

UNDER-SCREEN FINGERPRINT IDENTIFICATION DEVICE AND DISPLAY DEVICE

RELATED APPLICATIONS

This application is a National Phase of PCT Patent Application No. PCT/CN2019/117082 having International filing date of Nov. 11, 2019, which claims the benefit of priority Chinese Patent Application No. 201911039580.4 filed on Oct. 29, 2019. The contents of the above applications are all incorporated by reference as if fully set forth herein in their entirety.

FIELD AND BACKGROUND OF THE INVENTION

The present disclosure relates to a display technology field, and in particular, to an under-screen fingerprint identification device and a display device.

With the improvement of the overall technological design ability of mobile phones, consumers' aesthetics are also being guided and improved continuously. Therefore, the overall trend of mobile phone screen design is gradually changing to a whole screen design from the previous diversified design. Therefore, the design capability and process capability of related indicators of the overall screen of display screens such as screens with ultra-narrow frame have been continuously improved within less than a year, and the screen ratio has been gradually increased from 80% to 97%. Wherein the research on under-screen fingerprint identification is particularly hot. It directly integrates the fingerprint module into the screen, which greatly increases the screen ratio.

For organic light-emitting diode (OLED) display panels, there are more and more applications of under-screen optical fingerprint identification solutions. The under-screen optical fingerprint identification solution of the OLED display panel refers to detection of the fingerprint using light transmittance ability of the OLED display panel and light of the display panel itself to illuminate the finger.

At present, a light-guide plate solution is commonly used for under-screen fingerprint identification. Although this solution can realize light diffusion to the finger for fingerprint identification, the light intensity at an end away from a light source drops sharply, greatly affecting the imaging effect, and there is a need to add a separate light source, which also increases difficulty of the panel process.

Therefore, a new under-screen fingerprint identification device is needed to solve the shortcomings of the existing technology.

SUMMARY OF THE INVENTION

According to one aspect of the present disclosure, an embodiment of the present disclosure provides an under-screen fingerprint identification device configured for a display panel. The under-screen fingerprint identification device comprises a light guiding plate comprising a light guiding region, wherein the light guiding region is disposed in a display area of the display panel, and a light emitting element disposed under the light guiding region. Wherein the light emitting element comprises a plurality of light emitting pixel columns, the plurality of light emitting pixel columns form a light emitting pixel region as a light source for fingerprint identification, each of the plurality of light emitting pixel columns comprises a plurality of sensors.

In an embodiment, the plurality of sensors and the plurality of light emitting pixel columns are arranged alternatively.

In an embodiment, light intensity of the light emitting pixel region is not less than lowest light intensity recognized by the plurality of sensors.

In an embodiment, the under-screen fingerprint identification device further comprises a pressure sensing device disposed under the display panel and configured to sense a position coordinate of a pressed region in the light guiding region.

In an embodiment, the under-screen fingerprint identification device further comprises a determining module electrically connected with the pressure sensing device and configured to determine whether to start a fingerprint identification module.

In an embodiment, the fingerprint identification module comprises a processing module electrically connected with the determining module and configured to determine a starting position of the light emitting pixel region according to the position coordinate, a driving module electrically connected with the processing module and configured to drive the light emitting pixel region to illuminate according to the determined starting position, and an identification module electrically connected with the driving module and the plurality of sensors and configured for fingerprint identification according to an image information obtained by the plurality of sensors.

In an embodiment, the light emitting pixel region comprises a first light emitting pixel column located at a starting position of the light emitting pixel region, a second light emitting pixel column neighboring the first light emitting pixel column in a direction away from the pressed region, and a Nth light emitting pixel column neighboring a (N−1)th first light emitting pixel column in a direction away from the pressed region. Wherein the N is a natural number greater than or equal to 1.

In an embodiment, an incidence angle of light emitted by the first light emitting pixel column and incident on the light guide plate comprises a range from 41.8 degree to 60 degree.

In an embodiment, a vertical projection of the light guiding region projected onto the display area falls with an edge range of the display area.

According to the other aspect of the present disclosure, an embodiment of the present disclosure provides a display device comprising an under-screen fingerprint identification device as described above.

The advantages of the present disclosure are that defining the light guiding region in the display area and regarding the one or more light emitting pixel columns under the light guiding region as the light source allow using the light generated by the pixels for fingerprint identification after the light passes through the light guiding plate. Therefore, the under-screen fingerprint identification device does not need an additional light source, which is compatible with a manufacturing process of the display panel and highly feasible, and can adapt diversifying display panels (such as liquid crystal display panels, organic light-emitting diode display panels).

BRIEF DESCRIPTION OF THE SEVERAL VIEWS OF THE DRAWINGS

To describe the technical solutions of the embodiments of the present disclosure more clearly, the following briefly introduces the accompanying drawings used in the description of the embodiments of the present disclosure. Apparently, the accompanying drawings described below illustrate only some exemplary embodiments of the present disclosure, and persons skilled in the art may derive other drawings from the drawings without making creative efforts.

DESCRIPTION OF SPECIFIC EMBODIMENTS OF THE INVENTION

The technical solutions in the embodiments of the present disclosure will be described clearly and completely hereafter with reference to the accompanying drawings. Apparently, the described embodiments are only a part of but not all embodiments of the present disclosure. All other embodiments obtained by persons of ordinary skill in the art based on the embodiments of the present disclosure without creative efforts shall fall within the protection scope of the present disclosure.

In description of the disclosure, it should be understood that orientational or positional relationships represented by directional terms mentioned in the present disclosure, such as central, longitudinal, lateral, length, width, thickness, up, down, front, rear, left, right, vertical, horizontal, top, bottom, inside, outside, clockwise, anticlockwise, etc., are orientational or positional relationships based on the drawings, and are merely for the convenience of describing the present disclosure and simplifying the description, rather than indicating or implying that the device or element is intended to have a particular orientation, or is constructed and operated in a particular orientation, and therefore, should not be interpreted as a limitation of the application.

In addition, terms such as "first" and "second" are used herein for purposes of description, and should not be interpreted as indication or implication of relative importance, or implied indication of a number of the technical features. Therefore, features limited by terms such as "first" and "second" can explicitly or impliedly include one or more than one of these features. In description of the disclosure, "a plurality of" means two or more than two, unless otherwise specified.

Figure 1:
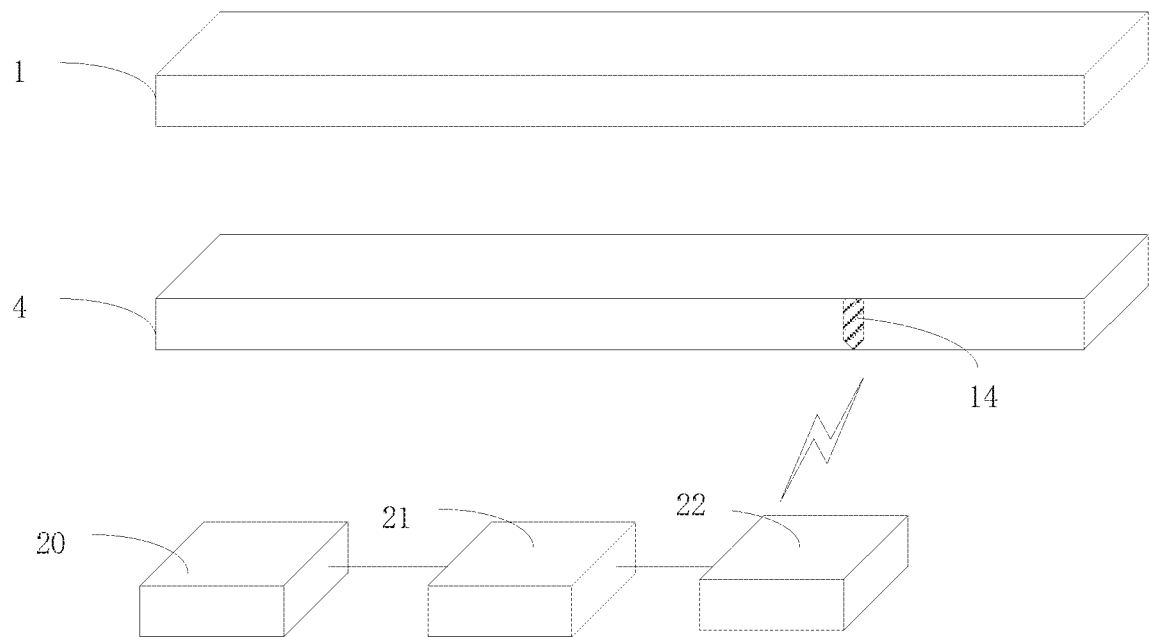
FIG. 1 is a schematic structure diagram illustrating an under-screen fingerprint identification device according to an embodiment of the present disclosure.

FIG. 1 illustrates an under-screen fingerprint identification device according to an embodiment of the present disclosure. The under-screen fingerprint identification device comprises a light guiding plate 1, a light emitting element 4, a sensor 14, a pressure sensing device 20, a determining module 21, and a fingerprint identification module 22.

The connection shown in FIG. 1 is intended only to describe the connection relationships between components, not to limit their specific location relationships. For example, the determining module 21 and the pressure sensing device 20 can also be located at a right side of the fingerprint identification module 22, and not limited hereto. In addition, a shape and a size of each component shown in FIG. 1 do not limit its specific structure and shape.

Figure 2:
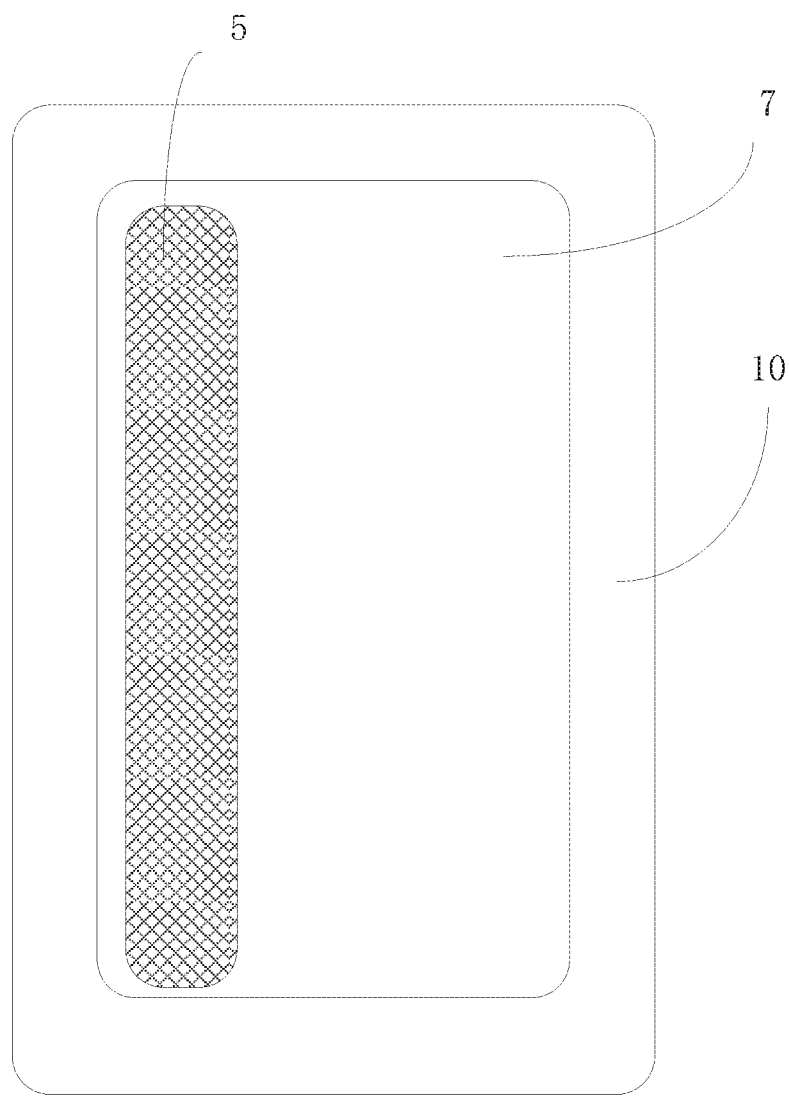
FIG. 2 is a top view of a schematic structure diagram illustrating an under-screen fingerprint identification device according to an embodiment of the present disclosure.

Combined with and referring to FIG. 2, a light guiding region 7 (an area in which the light guiding plate 1 is located) is defined in a display area 10 of a display panel. Although the light guiding region is not the whole display area 10 (in other words, the light guiding region does not occupy the whole display area), according to ergonomics, a finger in a periphery area of the light guide region 7 need not be specially recognized, therefore, it can be equivalent to full-screen fingerprint identification.

Figure 3:
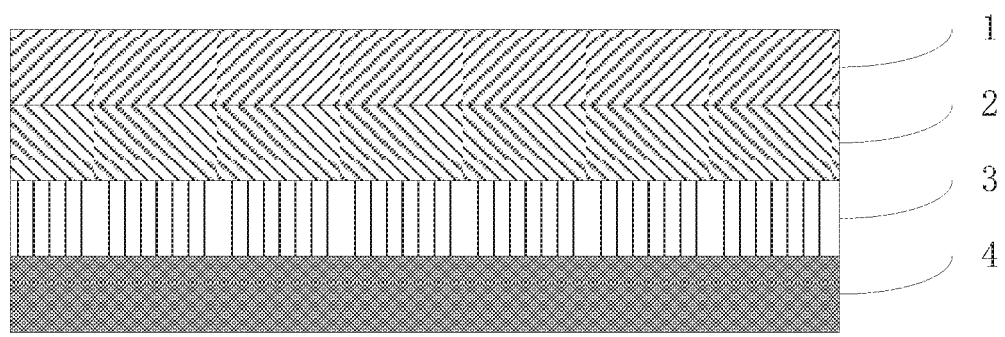
FIG. 3 is a schematic structure diagram illustrating a display panel according to an embodiment of the present disclosure.

The under-screen fingerprint identification device is configured for the display panel. The display panel comprises an adhesive layer 2 and a polarizer 3. Wherein specific configurations of the adhesive layer 2 and the polarizer 3 (relative to the under-screen fingerprint identification device) can be shown in FIG. 3.

Specifically, the adhesive layer 2 is made of OCA (optically clear adhesive), which is an optical adhesive used as a special adhesive to adhere transparent optical elements. The adhesive layer is required to have colorless transparency, have a light transmittance of more than 90%, have a good bonding strength, be cured at a room temperature or a medium temperature, and have a characteristics of low curing shrinkage. In the embodiment, it is used to adhere the light guiding plate 1 to the polarizer 3.

The polarizer 3 comprises PVA (polyvinyl alcohol), TAC (cellulose triacetate), PSA film (pressure sensitive adhesive), a release film and a protective film. Among them, the PVA layer is used for polarization, but PVA is easily hydrolyzed. In order to protect physical characteristics of polarization layer, a layer with high light transmittance, good water resistance and certain mechanical strength is compounded at each of both sides of the PVA for protection, forming the polarizer 3.

Figure 4:
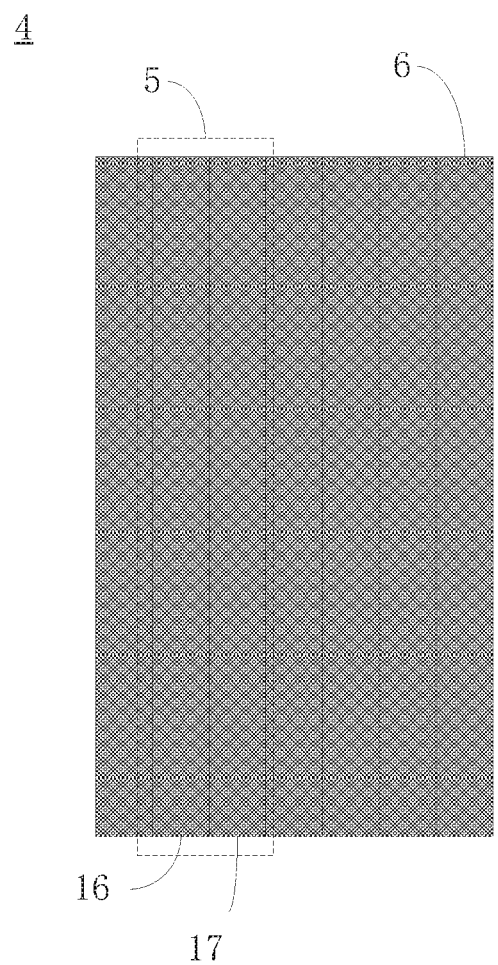
FIG. 4 is a schematic structure diagram illustrating a light emitting pixel region according to an embodiment of the present disclosure.

Combined with and referring to FIG. 4, the light emitting element 4 comprises a plurality of light emitting pixel columns 6, the plurality of light emitting pixel columns 6 form a light emitting pixel region 5 as a light source for fingerprint identification. Defining the light guiding region 7 in the display area 10 and regarding the one or more light emitting pixel columns 6 under the light guiding region 7 as a light source allow using the light generated by the light emitting pixel columns 6 for fingerprint identification after the light passes through the light guiding plate 1. Therefore, the under-screen fingerprint identification device does not need an additional light source, which is compatible with a manufacturing process of the display panel and highly feasible, and can adapt diversifying display panels (such as liquid crystal display panels, organic light-emitting diode display panels).

Figure 5:
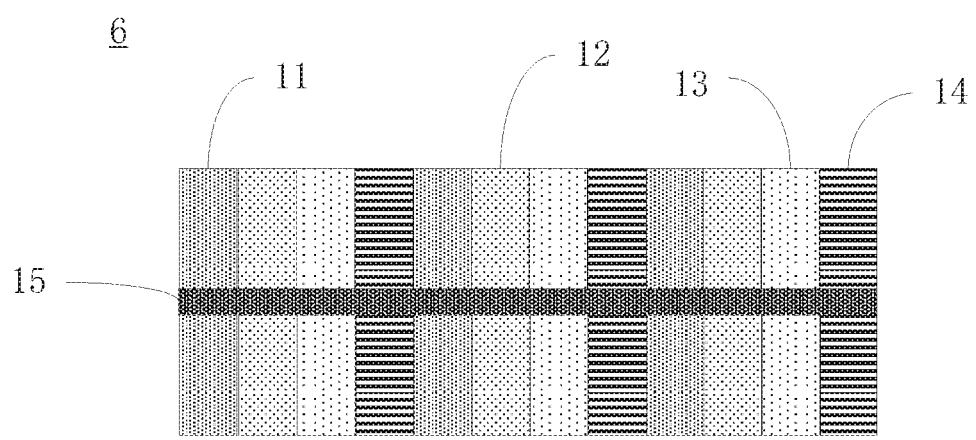
FIG. 5 is a schematic structure diagram illustrating a light emitting pixel column according to an embodiment of the present disclosure.

Combined with and referring to FIG. 5, the light emitting pixel column 6 is composed of a plurality of pixel units. In the embodiment, the plurality of pixel units comprise a first sub pixel 11, a second sub pixel 12, and a third sub pixel 13, in other embodiments not limited hereto. A sensor 14 and a black matrix 15 arranged on the same layer on which the plurality of pixel units is arranged are located in the light emitting pixel column.

Figure 6:
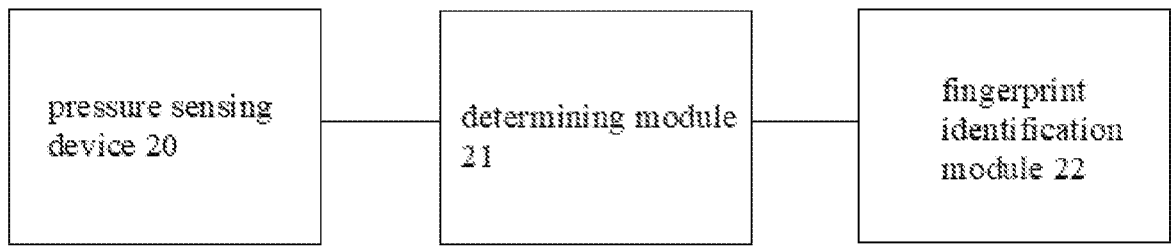
FIG. 6 is a schematic structure diagram illustrating an under-screen fingerprint identification device according to an embodiment of the present disclosure.

Combined with and referring to FIG. 6, in the embodiment, the under-screen fingerprint identification device 29 further comprises the pressure sensing device 20, the determining module 21, and the fingerprint identification module 22.

The pressure sensing device 20 is disposed under the display panel and configured to sense a position coordinate of a pressed region in the light guiding region 7.

The determining module 21 is electrically connected with the pressure sensing device 20 and configured to determine whether to start the fingerprint identification module 22. When an electrical signal sent by the pressure sensing device 20 is detected, the fingerprint identification module 22 is started, otherwise the determining module 21 continues waiting for the electrical signal.

Figure 7:
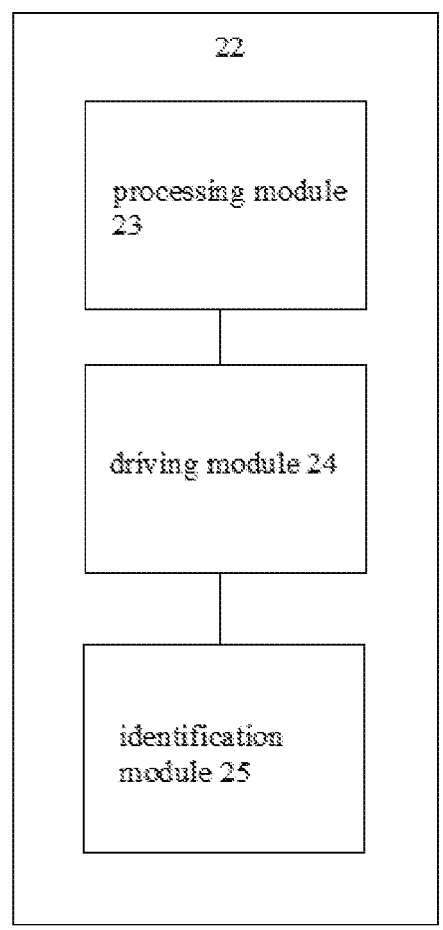
FIG. 7 is a schematic diagram illustrating a fingerprint identification module according to an embodiment of the present disclosure.

Combined with and referring to FIG. 7, the fingerprint identification module 22 comprises a processing module 23, a driving module 24, and an identification module 25.

The processing module 23 is electrically connected with the determining module 21 and configured to determine a starting position of the light emitting pixel region 5 according to the position coordinate.

The driving module 24 is electrically connected with the processing module 23 and configured to drive the light emitting pixel region 5 to illuminate according to the determined starting position.

The identification module 25 is electrically connected with the driving module 24 and the plurality of sensors 14 and configured for fingerprint identification according to an image information obtained by the plurality of sensors 14.

When fingerprint identification is performed, the light emitting pixel region 5 is formed under the light guiding plate 1. In the embodiment, the light emitting pixel region comprises a first light emitting pixel column 16 and a second light emitting pixel column 17. But not limited hereto, for example, it can also comprise three light emitting pixel columns or five light emitting pixel columns, wherein a number of light emitting pixel columns 6 comprised in the light emitting pixel region 5 depends on keeping light intensity of the light emitting pixel region 5 not less than minimum light intensity recognized by the sensors 14. This configuration allows the sensors 14 to receive enough light, keeping an imaging effect of the sensor 14 stable.

The first light emitting pixel column 16 is located at a start position of the light emitting pixel region 5. The second light emitting pixel column 17 is next to the first light emitting pixel column 16 in a direction away from the pressed region.

Figure 8:
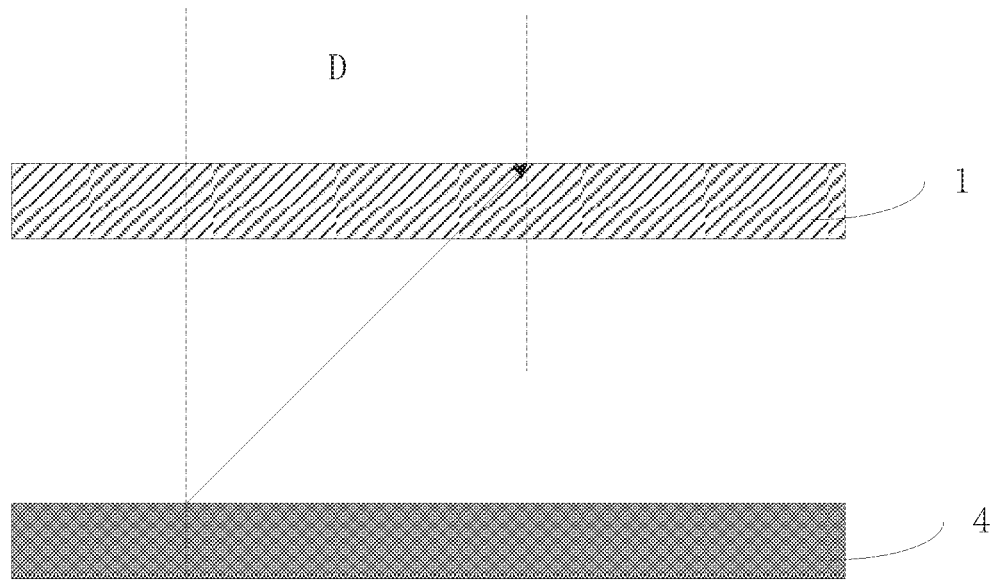
FIG. 8 is a schematic diagram illustrating a light emitting angle according to an embodiment of the present disclosure.

Combined with and referring to FIG. 8, in order to produce total reflected light, according to principle of total reflection, an angle (an acute angle between the light propagation direction and the dotted line in the figure) of light emitted from the light source (formed in a way of layer, or named light emitting layer) to an upper surface of the light guiding plate 1 needs to be more than 41.8 degrees. A large angle can cause a large length (a shortest distance D between two dotted lines in the figure) of the surface of the light guiding plate 1 which the light emitted to and the precision will be difficult to control. The angle (the acute angle between the light propagation direction and the dotted line in the figure) is suggested between 41.8 degrees to 60 degrees. In a normal display state, central brightness of the light is close to 0 degrees. In order to make the central brightness of the light offset to 41.8°, when collecting fingerprint signals (light), the light can be refracted to reach the above angle by micro-lens formed by power applying (controlling liquid crystals to form liquid crystal lens). In the normal display state, no power is applied, and the light passes normally.

Figure 9:
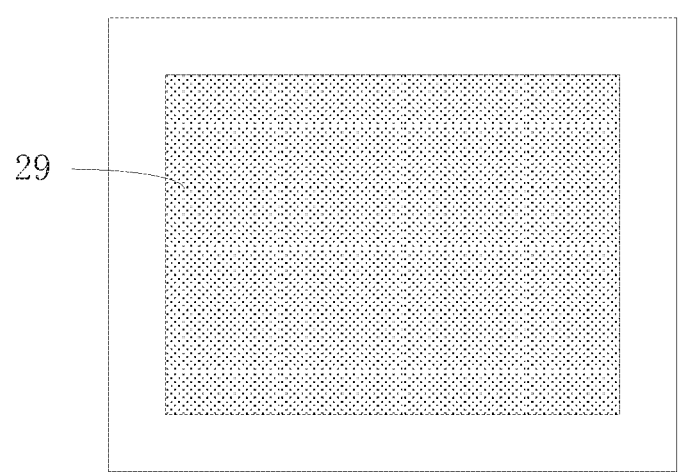
FIG. 9 is a schematic structure diagram illustrating a display device according to an embodiment of the present disclosure.

Referring to FIG. 9, an embodiment of the present disclosure provides a display device 30 comprising the under-screen fingerprint identification device 29 described above.

The display device 30 can be any products or components with display functions such as mobile phones, tablets, televisions, monitors, laptops, digital photo frames, and navigators.

The advantages of the present disclosure are that defining the light guiding region in the display area and regarding the one or more light emitting pixel columns under the light guiding region as the light source allow using the light generated by the pixels for fingerprint identification after the light passes through the light guiding plate. Therefore, the under-screen fingerprint identification device does not need an additional light source, which is compatible with a manufacturing process of the display panel and highly feasible, and can adapt diversifying display panels (such as liquid crystal display panels, organic light-emitting diode display panels).

Although the present disclosure has been disclosed in the above preferred embodiments, the above preferred embodiments do not intend to limit the present disclosure. Various modifications and changes may be made by ordinary person skilled in the art without departing from the spirit and scope of this application. Therefore, the scope of protection of this application is subject to the scope defined by the claims.

INDUSTRIAL PRACTICABILITY

The subject of this application may be manufactured and used in industry and has industrial practicability.

What is claimed is:

1. An under-screen fingerprint identification device configured for a display panel, comprising:
   a light guiding plate comprising a light guiding region, wherein the light guiding region is disposed in a display area of the display panel; and
   a light emitting element disposed under the light guiding region;
   wherein the light emitting element comprises a plurality of light emitting pixel columns, the plurality of light emitting pixel columns form a light emitting pixel region as a light source for fingerprint identification, and each of the plurality of light emitting pixel columns comprises a plurality of sensors, a plurality of pixel units, and a black matrix; wherein each of the plurality of pixel units comprises a first sub pixel, a second sub pixel, and a third sub pixel arranged in a row direction, each of the plurality of sensors is correspondingly disposed at a side of the third sub pixel away from the second sub pixel; and wherein the black matrix is disposed between adjacent two of the plurality of pixel units in a column direction and extends along the row direction.

2. The under-screen fingerprint identification device as claimed in claim 1, wherein the plurality of sensors are arranged at intervals.

3. The under-screen fingerprint identification device as claimed in claim 1, wherein light intensity of the light emitting pixel region is not less than lowest light intensity recognized by the plurality of sensors.

4. The under-screen fingerprint identification device as claimed in claim 1, further comprising a pressure sensing device disposed under the display panel and configured to sense a position coordinate of a pressed region in the light guiding region.

5. The under-screen fingerprint identification device as claimed in claim 4, wherein the light emitting pixel region comprises:
   a first light emitting pixel column located at a starting position of the light emitting pixel region;
   a second light emitting pixel column neighboring the first light emitting pixel column in a direction away from the pressed region; and
   a $N^{th}$ light emitting pixel column neighboring a $(N-1)^{th}$ first light emitting pixel column in a direction away from the pressed region;
   wherein the N is a natural number greater than or equal to 1.

6. The under-screen fingerprint identification device as claimed in claim 5, wherein an incidence angle of light emitted by the first light emitting pixel column and incident on the light guide plate comprises a range from 41.8 degree to 60 degree.

7. The under-screen fingerprint identification device as claimed in claim 1, wherein a vertical projection of the light guiding region is configured to be projected onto the display area and is configured to fall within an edge range of the display area.

8. A display device comprising an under-screen fingerprint identification device and a display panel, wherein the under-screen fingerprint identification device comprises:
   a light guiding plate comprising a light guiding region, wherein the light guiding region is disposed in a display area of the display panel; and
   a light emitting element disposed under the light guiding region;
   wherein the light emitting element comprises a plurality of light emitting pixel columns, the plurality of light emitting pixel columns form a light emitting pixel region as a light source for fingerprint identification, and each of the plurality of light emitting pixel columns comprises a plurality of sensors, a plurality of pixel units, and a black matrix; wherein each of the plurality of pixel units comprises a first sub pixel, a second sub pixel, and a third sub pixel arranged in a row direction, each of the plurality of sensors is correspondingly disposed at a side of the third sub pixel away from the second sub pixel; and wherein the black matrix is disposed between adjacent two of the plurality of pixel units in a column direction and extends along the row direction.

9. The display device as claimed in claim 8, wherein the plurality of sensors are arranged at intervals.

10. The display device as claimed in claim 8, wherein light intensity of the light emitting pixel region is not less than lowest light intensity recognized by the plurality of sensors.

11. The display device as claimed in claim 8, further comprising a pressure sensing device disposed under the display panel and configured to sense a position coordinate of a pressed region in the light guiding region.

12. The display device as claimed in claim 11, wherein the light emitting pixel region comprises:
   a first light emitting pixel column located at a starting position of the light emitting pixel region;
   a second light emitting pixel column neighboring the first light emitting pixel column in a direction away from the pressed region; and
   a $N^{th}$ light emitting pixel column neighboring a $(N-1)^{th}$ first light emitting pixel column in a direction away from the pressed region;
   wherein the N is a natural number greater than or equal to 1.

13. The display device as claimed in claim 12, wherein an incidence angle of light emitted by the first light emitting pixel column and incident on the light guide plate comprises a range from 41.8 degree to 60 degree.

14. The display device as claimed in claim 1, wherein a vertical projection of the light guiding region projected onto the display area falls within an edge range of the display area.

* * * * *